ALLEN H. TURNER
INVENTOR.

BY John R. Faulkner
Olin B. Johnson
ATTORNEYS

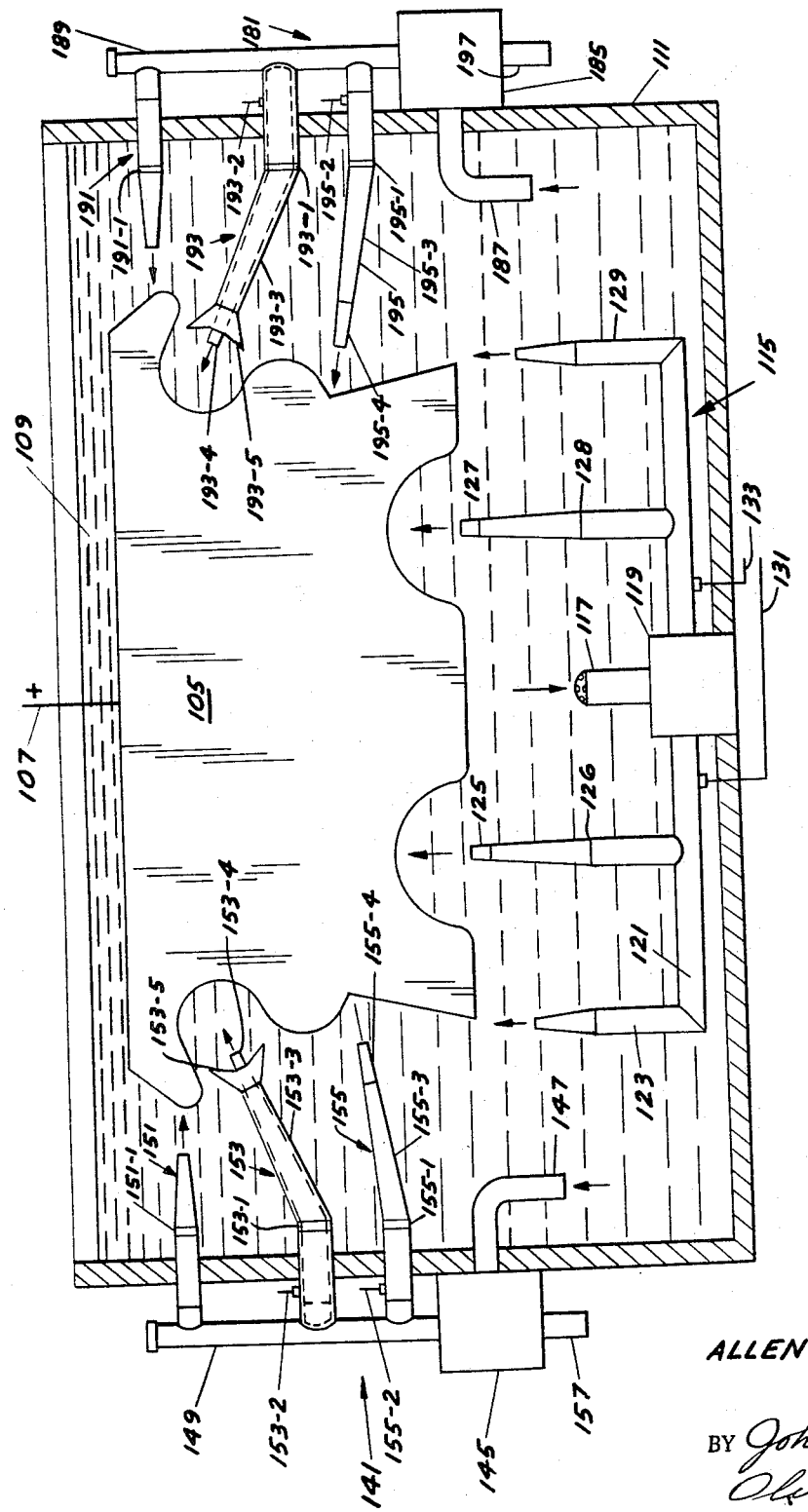

Aug. 27, 1968   A. H. TURNER   3,399,126
ELECTRODEPOSITION PROCESS AND APPARATUS
HAVING CONDUIT ELECTRODES
Filed Nov. 2, 1964   3 Sheets-Sheet 3
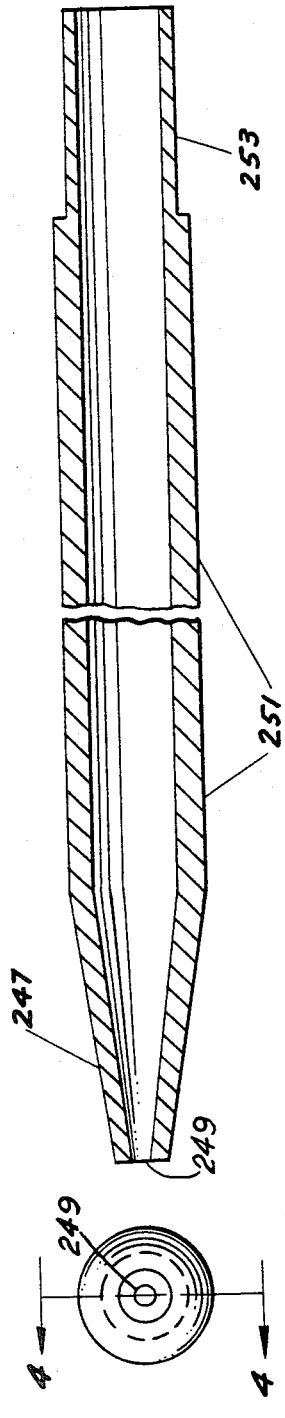
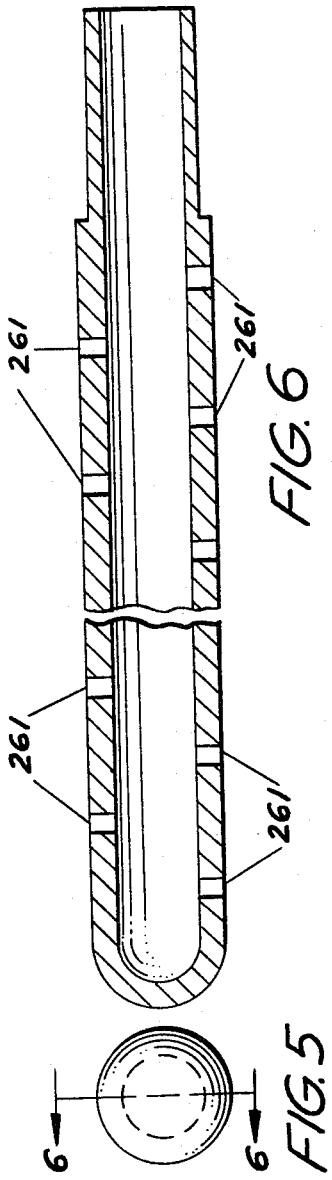
ALLEN H. TURNER
INVENTOR.
BY John R. Faulkner
Olin B. Johnson
ATTORNEYS United States Patent Office 3,399,126
Patented Aug. 27, 1968

3,399,126
ELECTRODEPOSITION PROCESS AND APPARATUS
HAVING CONDUIT ELECTRODES
Allen H. Turner, Ann Arbor, Mich., assignor to Ford
Motor Company, Dearborn, Mich., a corporation of
Delaware
Filed Nov. 2, 1964, Ser. No. 407,986
8 Claims. (Cl. 204—181)

ABSTRACT OF THE DISCLOSURE

Method and means for coating wherein an electrically conductive object serving as a first electrode is provided with an electrically induced coating within an aqueous coating bath having an organic coating material dispersed therein by providing a direct current flow of electrical energy through said bath between said first electrode and a second electrode in electrical communication with said bath characterized by passing said first electrode along a predetermined path through said bath and discharging a plurality of spaced apart aqueous streams from one or more conduit electrodes against said first electrode beneath the surface of said bath while said first electrode traverses said path.

---

This invention relates to the coating of an electrically conductive object by electrically induced deposition of an organic coating material from a liquid bath. In particular, this invention is concerned with continuous electrocoating processes wherein metallic objects are passed through and coated within an aqueous bath by an organic coating material dispersed therein. More particularly, this invention is concerned with an improved method and means for coating objects having complex external configurations.

In continuous electrocoating each workpiece becomes a part of an electrical circuit and is passed through a coating bath that is in electrical communication with at least one other electrode of the circuit which is at a different electrical potential with respect to the workpiece. For purposes of simplicity this invention will be described with reference to an embodiment of electrocoating wherein the workpiece is electrically connected to the power source in a manner such that in passing through the coating bath it is positively charged and serves as the anode of the deposition cell. In this embodiment the chemical composition of the material to be deposited is anodically attracted, e.g., comprises an organic compound having one or more water dissociable carboxylic acid groups within its molecular structure. It is to be understood however that the method and apparatus of this invention may be utilized where the polarities of the electrodes are reversed and a cathodically attracted coating material is employed.

Ordinarily, the principal repelling electrode in an electrocoating system is the tank which also serves to retain the coating bath. When a workpiece of complex configuration is passed through the bath, the distances between various areas on the object and the nearest portion of the tank electrode may differ significantly and the shape of different surface areas on the object may vary from that of a curve having a large radius of curvature to that of a sharply defined line or point. As a result effective current densities vary significantly over the workpiece. Heretofore, this variance has limited the efficiency of electrocoating and resulted in continuous search for methods and materials that would provide adequate coverage in the areas of lowest field intensity without having a deleterious effect in the areas of highest field intensity. For instance, if the overall current density can be safely increased better coverage can be obtained within the areas of lowest field intensity. The capacity of a given system to effect coverage of such areas has been termed the "throwing power" of the system. It is not practical, however, to increase the overall current density if in so doing film rupture or other coating defeats result in the areas of highest field intensity. The composition of the coating material employed is a major factor in determining the tolerable limits for a given system.

It has now been discovered that the acceptance of organic coating material upon a metal object of complex configuration can be equalized by providing local control over the field intensity opposite preselected surface areas of the objects to be coated and/or selectively controlling bath agitation opposite preselected surface areas of the same.

It is one object of this invention to provide improved methods and means for equalizing deposit of an organic coating material upon a metal object in a method of electrically induced deposition.

It is another object of this invention to provide methods and means for improving the overall quality of organic coatings established upon metal objects by electrically induced deposition.

With the foregoing and other objects in view as will hereinafter become apparent, this invention comprises the methods, combinations, construction and arrangement of parts hereinafter described and/or illustrated in the accompanying drawings, wherein:

FIGURE 2 is a schematic sectional view of one embodiment of electrocoating apparatus of the type shown in FIGURE 1;

FIGURE 3 is an end view of one embodiment of a hollow electrode suitable for use with this invention;

FIGURE 4 is a view taken along line 4—4 of FIGURE 3;

FIGURE 5 is an end view of another embodiment of a hollow electrode suitable for use with this invention; and FIGURE 6 is a view taken along line 6—6 of FIGURE 5.

Figure 1:
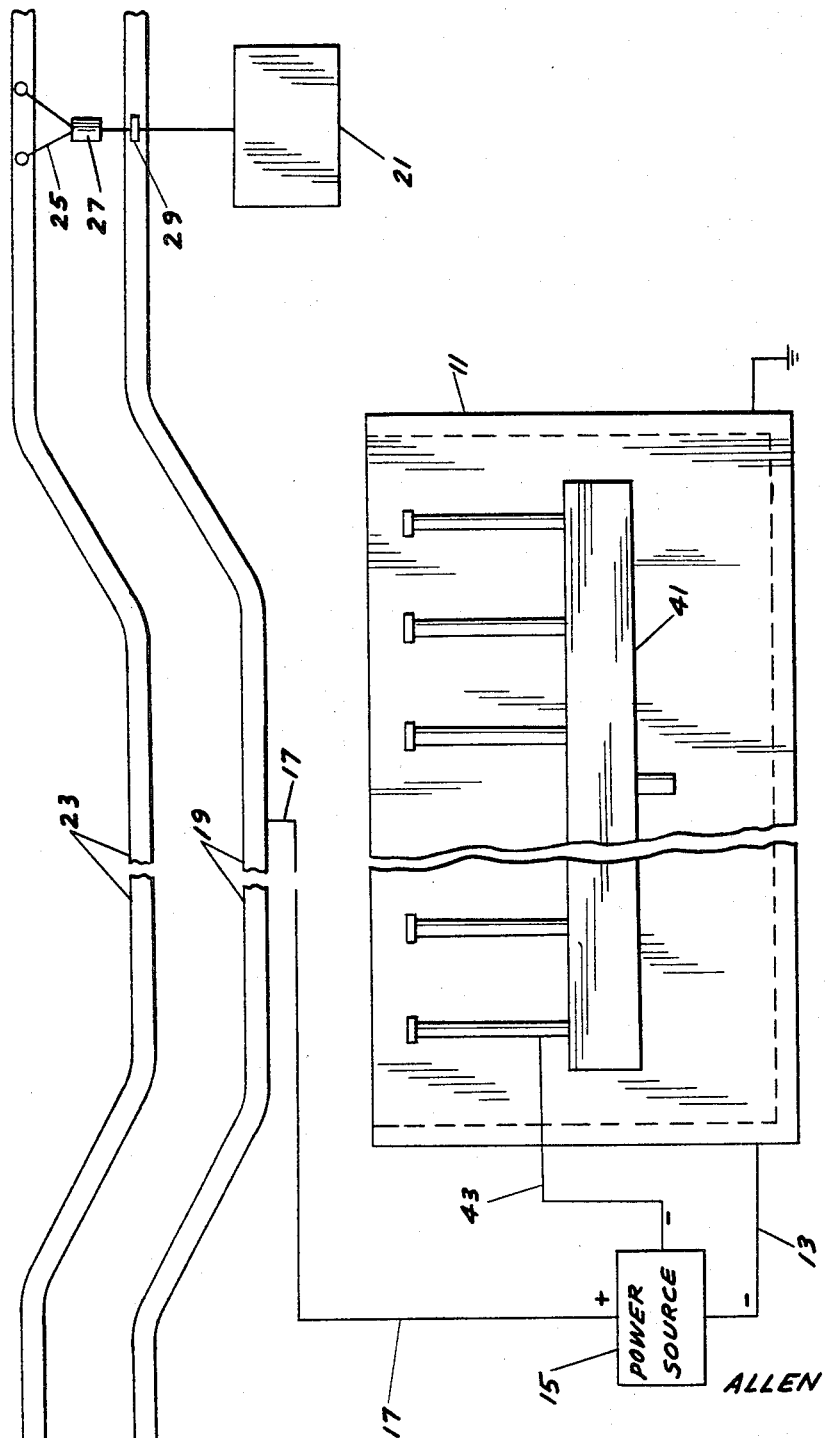
FIGURE 1 is a schematic side view of one embodiment of apparatus suitable for use in a continuous electrocoating operation.

Referring now to FIGURE 1, an electrically conductive coating tank 11 is in electrical communication with a negative terminal of power supply unit 15 via conductor 13 and here serves as the principal cathode of the coating cell. Coating tank 11 is also in electrical communication with ground. In another embodiment tank 11 is of nonconductive material and cathodes are positioned therein. Positioned along the side of tank 11 is an electrode support and recycle unit 41 hereinafter discussed in relation to FIGURE 2. The electrodes of this unit, not shown here, are electrically connected to a negative terminal of power supply unit 15 via conductor 43. A positive terminal of power supply unit 15 is in electrical communication with a bus bar 19 via conductor 17. A metal part 21 is shown approaching the coating tank 11 supported from conveyor rail 23 by a hanger 25. Conveyor rail 23 is representative of a conventional electrically powered conveyor system wherein an endless chain, not shown, is moved along rail 23 to impel the workpieces through the coating bath.

The lower portion of hanger 25 is electrically insulated from the grounded conveyor by an insulator 27. This portion of hanger 25 carries a contact brush or plate 29 by which hanger 25 and workpiece 21 are maintained in electrical connection with bus bar 19.

Power supply unit 15 is constructed and arranged to provide between the aforementioned electrodes and through the coating bath a direct current flow of electrical energy that is commensurate with the size of the electrocoating operation contemplated. Ordinarily, such current is provided by rectification of an alternating current power source or by a direct current generator. Potentials in the range of about 50 to 500, usually 100 to 300 volts, is suitable with most coating compositions.

Referring now to FIGURE 2, the electrocoating apparatus here shown utilizes a plurality of flow-through electrodes which may be either fixed or adapted for limited movement as hereinafter explained. An irregularly shaped workpiece 105 supported by a positively charged hanger 107 is shown passing through a coating bath 109 retained by tank 111 which is negative and grounded. Coating tank 111 is provided with a plurality of electrode support and recycle units here represented by a bottom unit 115 and side units 141 and 181.

Bottom unit 115 comprises an inlet conduit 117 in fluid communication with a pump within pump housing 119, horizontally aligned feeder conduit 121 in fluid communication with pump 119 and a plurality of vertically aligned discharge conduits 123, 125, 127 and 129. Feeder conduit 121 comprises a tube of copper or other suitable metal or alloy covered with a suitable nonconductor, e.g., plastic. The tube is in electrical communication with one or more negative terminals of a direct current power source, not shown, via conductors 131 and 133 and may be either a continuous conductor or divided at an intermediate point by insulation means. In this embodiment conduits 125 and 127 are tubular conductors in both fluid and electrical communication with feeder conduit 121. Except for the indicated tip portions, conduits 125 and 127 are covered with nonconductive or insulative jackets 126 and 128 respectively. Conduits 123 and 129 are in fluid communication with conduit 121 but in this embodiment do not constitute electrodes. They may be formed of suitably nonconductive materials or of metal in which case insulators are interposed between such conduits and feeder conduit 121. In another embodiment conduits 123 and 129 serve as electrodes and conduits 125 and 127 are nonconductors. In still another embodiment all of the conduits serve as electrodes. Thus, this unit can be designed or modified from time to time in accordance with the configuration of the workpieces passing through the bath.

Feeder conduit 121 is slidably mounted within pump housing 119 permitting lateral adjustment of the electrodes of this unit. In one embodiment unit 115 is duplicated at regularly spaced intervals along the longitudinal axis of the bottom of tank 111. In another embodiment unit 115 is slidably mounted upon track means positioned along the center line of the tank bottom and adapted to move below and abreast of a workpiece passing through the tank. In this embodiment the electrodes of the unit may be in electrical communication with the tank 111 via such track or through cable means affixed to pump housing 119 and drawn through the bath as such unit traverses such track. Such cable may be combined with retraction means for returning such unit to the end of the tank at which workpieces enter.

In the operation of unit 115 coating bath is drawn into the unit through inlet conduit 117 by a pumping means situated within pump housing 119 and forced through feeder conduit 121 and thence through conduits 123, 125, 127 and 129.

Side unit 141 comprises a pump housing 145 having pumping means, not shown, situated therein, an elbow shaped inlet conduit 147 extending through the wall of tank 111, having inlet means immersed within the coating bath and outlet means in fluid communication with said pumping means, a plurality of upright feeder conduits extending upward from pump housing 145 and here represented by feeder conduit 149, and a plurality of discharge conduits in fluid communication with the upright feeder conduits and extending through the wall of tank 111. Such conduits are here represented by conduits 151, 153 and 155 which connect with feeder conduit 149. Conduit 157 is positioned so that it can be placed in fluid communication with pump housing 145 when external feed or bath discharge through this unit is desirable.

In the embodiment here shown each of the conduits 151, 153 and 155 each have a flexible joint 151-1, 153-1 and 155-1 respectively. These allow for elevation, depression or lateral movement of the tips as desired. Conduits 153 and 155 are metal tubes and serve as electrodes. These electrodes are grounded and individually connected to negative terminals of a direct current power source, not shown, via conductors 153-2 and 155-2 respectively.

In this embodiment the electrodes 153 and 155 are covered with an insulative jacket, 153-3 and 155-3 respectively, from their connection with feeder conduit 149 to their exposed tips 153-4 and 155-4 respectively. In other embodiments these electrodes are in electrical communication with the coating tank 111 and have no independent connection with the power source. Electrode 153 also bears near the end of insulative jacket 153-3 an insulative shield 153-5 to permit its use in close proximity with areas of the workpiece with relation to which a significant localized increase in current density is undesirable.

In this embodiment conduit 151 is not employed as an electrode. It may be either a nonconductor or merely insulated from tank 111. It is to be understood, however, that it is within the scope of this invention to individually or collectively charge each of the conduits projecting into the bath or to utilize any one or combination of the same without charge as the individual coating operation dictates.

In this embodiment the construction and operation of electrode support and recycle unit 181 is identical with that of unit 141. It comprises a pump housing 185 having pumping means, not shown, situated therein, an elbow shaped inlet conduit 187, a plurality of upright feeder conduits extending upward from pump housing 185 and here represented by feeder conduit 189, and discharge conduits 191, 193 and 195 which connect with conduit 189. A conduit 197 is positioned so that it can be placed in fluid communication with pump housing 185 for external feed or bath discharge. Conduits 191, 193 and 195 each have a flexible joint, 191-1, 193-1 and 195-1 respectively. Conduits 193 and 195 are grounded and individually connected to negative terminals of a direct current power source, not shown, via conductors 193-2 and 195-2. These electrodes have insulative jackets 193-3 and 195-3 respectively, and exposed tips 193-4 and 195-4 respectively. Electrode 193 is equipped with an insulative shield 193-5.

In the operation of the apparatus shown in FIGURE 2, a portion of the coating bath is drawn into the aforementioned pumping means via inlet conduits 117, 147 and 187 and corresponding components of other electrode support and recycle units where employed. This material is then forced via said pumping means through the principal feeder conduits, e.g., 121, 149 and 189, and thence through the smaller discharge conduits, e.g. 123, 125, 127, 129, 151, 153, 155, 191, 193 and 195, to discharge beneath the surface of the bath 109 and against or along predetermined surfaces of the workpiece to be coated. A plurality of the discharge conduits serve as electrodes of opposite polarity to that of the workpiece and thus locally reduce the distance between opposing electrodes opposite areas which because of shielding or configuration would constitute areas of lesser current density when the coating tank is employed as the sole cathode. It is within the scope of this invention to individually regulate both the volume and pressure of bath flow through the various discharge conduits as well as to individually regulate the difference in electrical potential between the conduits employed as electrodes and the workpiece. Flow control is achieved by conventional means as, for example, by utilizing a plurality of separate pumping means and by control of the design of the discharge conduits. Other discharge conduits of the system, e.g., 123, 129, 151 and 191 may be utilized as here shown without electrical charge. In this capacity they discharge a bath stream upon sharp edges of the workpiece beneath the surface of the bath. This discharge continuously brings a fresh supply of coating material to these surfaces, provides a cooling effect in the areas of greatest current density and advantageously affects film formation in other ways not fully understood. In certain embodiments discharge conduits serving as electrodes are employed opposite areas of the type last described while other discharge electrodes of greater surface area and/or potential difference are employed opposite more shielded areas.

In one embodiment, the flow-through electrodes have internal diameters that decrease in the direction of the liquid flow therethrough. Such an electrode is illustrated in FIGURES 3 and 4. The embodiment shown in FIGURES 3 and 4 has a tapered end portion 247 which is provided with a single orifice 249. End portion 247 is in fluid communication with a central tubular section 251 and a second end section 253 which is of reduced external diameter. Central section 251 and end section 253 are of even internal diameters. In the flow-through electrode of FIGURES 5 and 6, the internal diameter is constant and a plurality of orifices 261 are evenly spaced about its perimeter. In another embodiment, not shown, these designs are combined to provide a tapered nozzle having a plurality of orifices.

The following examples illustrate some of the advantages provided by operating an electrocoating process in accordance with the invention hereinbefore and hereinafter described.

EXAMPLE I

An electrocoating bath is formed by dispersing one volume of a commercially available (black) automobile primer paint containing about 40 weight percent solids within four volumes of water with the aid of an emulsifying amount of a water soluble amine. The primary constituents of the primer are a conventional organic binder, i.e., an organic resin having free or water dissociable carboxylic acid groups in its molecular structure, and a black pigment.

A grounded copper tube is immersed in the bath and served as the cathode of the cell. The mild steel workpiece is positively charged in relation to the copper tubing.

In the first coating operation a difference of potential of 100 volts is maintained between the workpiece and the copper tube until a smooth coating of about 0.5 mil thickness is obtained upon the surfaces of the workpiece directly exposed to the cathode. The difference of potential is increased to 175 volts. The film obtained with this paint under these conditions with the same electrode surface area and spacing ruptures leaves a plurality of "blisters" in the coating surface. Employing identical conditions a portion of the bath is pumped through the copper cathode and directed against a surface of the workpiece. A flow rate of about 4.5 gallons per minute from the interior of the cathode is employed. Under these conditions smooth films are obtained upon workpieces at potentials of 100, 150 and 250 volts.

EXAMPLE II

An electrocoating paint is prepared in the following manner:

(1) 1893 pounds of tall oil fatty acids (a mixture containing 98.9 percent tall oil acids and 0.5 percent resin acids, acid number 199, saponification number 200, viscosity Gardner sec. 0.9, unsaponifiables 0.6) are charged to a vessel and heated to 150° F.

(2) To the heated acids are added one pound sodium benzoate.

(3) To the resulting mixture are added 1509 pounds of an epoxy resin (glycidyl ether of Bisphenol A, visc. cps. at 25° C. 7000–9000, epoxy equivalent 185–195, i.e., grams of resin containing one gram-equivalent of epoxide).

(4) The resulting material is heated to 500° F. and for a time sufficient to provide an acid number of less than about 0.2.

(5) The resulting material is cooled to 330° F. and 527 pounds of the anhydride of 1,2,4-benzene tricarboxylic acid are added and the temperature maintained at 330° F. until the resulting resin has an acid number of 62.

(6) To this resin at 330° F. are added 974 pounds of methyl ethyl ketone and the mixture is allowed to cool.

(7) 44 pounds of the solution of resin-methyl ketone from the preceding step and 3.2 pounds of black iron oxide are admixed and ground for 16 hours after which 30 additional pounds of the resin-methyl ethyl ketone material of the preceding step are added and the resulting mixture is ground for an additional hour.

(8) To a sonic type homogenizer containing 47.6 pounds deionized water, 0.3 pound triisopropanolamine, and 1.1 pounds diethylamine, are added 25 pounds of the material prepared in the preceding step and 5 pounds methyl ethyl ketone. This material is agitated until fully emulsified and the solvent is removed. Specifically, the temperature of the emulsion is raised to about 150° F. to vaporize the methyl ethyl ketone. The vaporized solvent is then removed by reducing the pressure above the oil-in-water type emulsion to about 50 mm. Hg with a conventional vacuum pump.

An electrocoating bath having a pH of 8.25 and containing 5.2 weight percent paint solids is prepared by diluting this emulsion with deionized water.

Electrically induced deposition of the paint thus prepared is carried out within a coating tank which is grounded and serves as a cathode of the electrodeposition cell. The tank is equipped with electrode support and recycle units as hereinbefore described and illustrated in FIGURE 2. The flow-through electrodes are positioned and controlled with regard to flow rate and potential in a manner such that the effective current density is substantially equalized over the body surfaces. A paint film of effective depth and continuous coverage is effected over the body surfaces. The workpiece is withdrawn from the bath, rinsed, and baked in a conventional curing oven.

It will be understood by those skilled in the art that modifications can be made in the details of the foregoing specific examples of this invention without departing from the spirit and scope of the invention as set forth in the appended claims.

I claim:

1. In a method of coating wherein an electrically conductive object serving as a first electrode is provided with an electrically induced coating within an aqueous coating bath having an organic coating material dispersed therein by providing a direct current flow of electrical energy through said bath between said first electrode and a second electrode in electrical communication with said bath, the improvement which comprises passing said first electrode along a predetermined path through said bath and discharging a plurality of spaced apart aqueous streams against said first electrode from a plurality of conduit electrode orifices beneath the surface of said bath while said first electrode traverses said path.

2. In a method of coating wherein an electrically conductive object serving as a first electrode is provided with an electrically induced coating within an aqueous coating bath having an organic coating material dispersed therein by providing a direct current flow of electrical energy through said bath between said first electrode and a second electrode in electrical communication with said bath, the improvement which comprises passing said first electrode along a predetermined path through said bath and simultaneously discharging a plurality of aqueous streams against preselected surface areas of said first electrode from a plurality of conduit electrodes having outlet means positioned along said path and beneath the surface of said bath.

3. In a method of coating wherein an electrically conductive object serving as a first electrode is provided with an electrically induced coating within an aqueous coating bath having an organic coating material dispersed therein by providing a direct current flow of electrical energy through said bath between said first electrode and a second electrode in electrical communication with said bath, the improvement which comprises passing said first electrode along a predetermined path through said bath, simultaneously discharging a plurality of aqueous streams against preselected surface areas of said first electrode from a plurality of conduit electrode orifices beneath the surface of said bath, a plurality of said streams passing through tubular electrodes before contacting said first electrode, and providing a direct current flow of electrical energy through said bath between said first electrode and said tubular electrodes.

4. In a method of coating wherein an electrically conductive object serving as a first electrode is provided with an electrically induced coating within an aqueous coating bath having an organic coating material dispersed therein and situated within an electrically conductive coating tank serving as a second electrode by providing a direct current flow of electrical energy through said bath between said first electrode and said second electrode, the improvement which comprises passing said first electrode along a predetermined path through said bath, positioning along said path a plurality of tubular conduit electrodes having an orifice spaced apart from said path a lesser distance than the nearest portion of said second electrode, forcing through said tubular conduit electrodes streams of said coating bath, and discharging said streams from said tubular conduit electrodes and against preselected surface areas on said first electrode beneath the surface of said coating bath as said first electrode traverses said path.

5. In a method of coating wherein an electrically conductive object serving as a first electrode is provided with an electrically induced coating within an aqueous coating bath having an organic coating material dispersed therein and situated within an electrically conductive coating tank serving as a second electrode by providing a direct current flow of electrical energy through said bath between said first electrode and said second electrode, the improvement which comprises passing said first electrode along a predetermined path through said bath, positioning along said path a plurality of tubular electrodes having an orifice spaced apart from said path a lesser distance than the nearest portion of said second electrode, forcing through said tubular electrodes streams of said coating bath, discharging said streams from said tubular electrodes and against preselected surface areas on said first electrode beneath the surface of said coating bath and providing a direct current flow of electrical energy through said coating bath between said first electrode and said second electrode as said first electrode traverses said path.

6. In a method of coating wherein an electrically conductive object serving as a first electrode is provided with an electrically induced coating within an aqueous coating bath having an organic coating material dispersed therein and situated within an electrically conductive coating tank serving as a second electrode by providing a direct current flow of electrical energy through said bath between said first electrode and said second electrode, the improvement which comprises passing said first electrode along a predetermined path through said bath, positioning within said bath a plurality of supplementary conduit electrodes of lesser surface area than said second electrode and having an orifice therein spaced apart from said path a lesser distance than the nearest portion of said second electrode at preselected depths within said coating bath, and maintaining a direct current flow of electrical energy through said bath and between said first electrode and said supplementary electrodes as said first electrode traverses said path.

7. Apparatus for use in electrically induced deposition of an organic coating material upon an electrically conductive object submersed within an aqueous dispersion thereof which comprises in combination a tank adapted to retain an aqueous bath, conveyor means constructed and arranged to propel an electrically conductive object along a predetermined path spaced apart from said tank and beneath the upper surface of an aqueous bath retained therein, a plurality of tubular conduits extending into said tank for admitting of the flow of a stream of liquid therethrough and having exit means positioned to direct the discharge of a stream issuing therefrom within said bath and against a preselected surface area of an object traversing said path, pumping means constructed and arranged to force a stream of liquid through said conduits and into said bath, and means for providing a direct current flow of electrical energy between a plurality of said tubular conduits and an electrically conductive object traversing said path.

8. Apparatus for use in electrically induced deposition of an organic coating material upon an electrically conductive object submersed within an aqueous dispersion thereof which comprises in combination an electrically conductive tank adapted to retain an aqueous bath, conveyor means constructed and arranged to propel an electrically conductive object along a predetermined path spaced apart from said tank and beneath the upper surface of an aqueous bath retained therein, means for providing a direct current flow of electrical energy through said bath and between said tank and said object, a plurality of tubular conduits extending into said bath through the walls of said tank for admitting of the flow of an aqueous stream therethrough and having outlet means positioned to direct the discharge of a stream issuing therefrom within said bath and against a preselected surface area of an object traversing said path, pumping means constructed and arranged to withdraw a portion of said bath and force said portion through said tubular conduits and against an object traversing said path, and means for providing a direct current flow of electrical energy between said tubular conduits and an electrically conductive object traversing said path.

References Cited

UNITED STATES PATENTS

| | | | |
|---|---|---|---|
| 950,973 | 3/1910 | Wallace | 204—237 |
| 2,431,629 | 11/1947 | Wind et al. | 204—181 |
| 3,200,057 | 8/1965 | Burnside et al. | 204—181 |
| 3,211,639 | 10/1965 | McNeill et al. | 204—299 |
| 3,325,390 | 6/1967 | Burnside et al. | 204—300 |

FOREIGN PATENTS 10,317    6/1899    Great Britain.

HOWARD S. WILLIAMS, *Primary Examiner.*

E. ZAGARELLA, *Assistant Examiner.*